(12) United States Patent
Nakayama et al.

(10) Patent No.: US 10,450,026 B2
(45) Date of Patent: Oct. 22, 2019

(54) AIR GUIDE STRUCTURE OF A SADDLE-TYPE VEHICLE

(71) Applicant: SUZUKI MOTOR CORPORATION, Hamamatsu-Shi, Shizuoka-Ken (JP)

(72) Inventors: Yoshihisa Nakayama, Hamamatsu (JP); Tomoaki Yoshikawa, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 92 days.

(21) Appl. No.: 15/715,858

(22) Filed: Sep. 26, 2017

(65) Prior Publication Data

US 2018/0093731 A1    Apr. 5, 2018

(30) Foreign Application Priority Data

Sep. 30, 2016   (JP) .................................. 2016-193589

(51) Int. Cl.
| | |
|---|---|
| *B62J 17/04* | (2006.01) |
| *B62J 17/02* | (2006.01) |
| *B62K 11/04* | (2006.01) |
| *B62J 17/08* | (2006.01) |

(52) U.S. Cl.
   CPC .............. *B62J 17/04* (2013.01); *B62J 17/02* (2013.01); *B62K 11/04* (2013.01); *B62J 2017/086* (2013.01)

(58) Field of Classification Search
   CPC ....... B60J 1/00; B60J 1/20; B62J 17/00; B62J 17/02; B62J 17/04; B62J 17/06; B62K 19/48

USPC ........... 296/78.1, 180.1, 181.5; 180/219, 229
   See application file for complete search history.

(56) References Cited

U.S. PATENT DOCUMENTS

| | | | | |
|---|---|---|---|---|
| 4,830,135 A | * | 5/1989 | Yamashita | ............. B60K 11/08 123/41.7 |
| 8,881,859 B2 | * | 11/2014 | Nakamura | ............... B62J 17/02 180/229 |
| 8,899,668 B2 | * | 12/2014 | Yokouchi | ................. B62J 17/00 296/180.1 |
| 8,936,123 B2 | * | 1/2015 | Kogo | ................... B60Q 1/0433 180/219 |
| 10,166,909 B2 | * | 1/2019 | Suzuki | ................. B60Q 1/0023 |

(Continued)

FOREIGN PATENT DOCUMENTS

JP        2002-284073 A    10/2002

*Primary Examiner* — Jason S Daniels
(74) *Attorney, Agent, or Firm* — Barnes & Thornburg LLP

(57) ABSTRACT

An air guide structure of a saddle-type vehicle includes a front side cover which covers a front side of the saddle-type vehicle, extends in a vehicle longitudinal direction, and includes a first cover member and a second cover member. The first cover member is arranged inside the second cover member. The second cover member overlaps the first cover member to partially cover the first cover member from outside. A cavity extending in the vehicle longitudinal direction is formed as an air guide passage by overlapping the first cover member and the second cover member. An outer edge of the second cover member separates from the first cover member at a part of a front side of the air guide passage to form a gap. An air intake hole is formed downward by the gap and is configured to introduce traveling air into the air guide passage.

17 Claims, 14 Drawing Sheets

(56) References Cited

U.S. PATENT DOCUMENTS

| | | | | |
|---|---|---|---|---|
| 2006/0087144 A1* | 4/2006 | Kamimura | ............... | B62J 17/02 |
| | | | | 296/78.1 |
| 2013/0320697 A1* | 12/2013 | Yokouchi | ............... | B62J 17/065 |
| | | | | 296/78.1 |
| 2016/0090144 A1* | 3/2016 | Shimizu | ................ | B62K 19/48 |
| | | | | 296/180.1 |

* cited by examiner

AIR GUIDE STRUCTURE OF A SADDLE-TYPE VEHICLE

CROSS-REFERENCE TO RELATED APPLICATIONS

This application claims the benefit of priority of Japanese Patent Application No. 2016-193589, filed Sep. 30, 2016, the entire contents of which are incorporated herein by reference.

BACKGROUND OF THE INVENTION

Field of the Invention

The present invention relates to an air guide structure of a saddle-type vehicle configured to introduce traveling air into an air guide passage provided inside a vehicle-body cover.

Description of the Related Art

Conventionally, there is a known air guide structure configured to take in traveling air (traveling wind) from an air intake hole provided on a front cover at a vehicle front and to exhaust the traveling air toward the front of a rider in order to block the traveling air which flows along outer sides of the front cover and then rolls to the front space of the rider. For instance, Patent Document 1 (Japanese Patent Laid-Open No. 2002-284073) discloses an air guide structure which takes in traveling air from an air guide port provided on a front cowl of a scooter-type motorcycle and exhausts the traveling air from an air-exhaust port provided lateral to or under a meter panel.

However, when a front cover is provided with an air intake hole opened forward like a conventional air guide structure, this air intake hole is conspicuous and equipment inside this vehicle becomes visible through this air intake hole, which degrades appearance of this vehicle. Additionally, foreign materials such as rainwater and dust are easily ingested from the air intake hole during vehicle travel, and a structure for removing such foreign materials is required, which complicates the structure of the vehicle-body cover.

SUMMARY OF THE INVENTION

The present invention has been made in consideration of the above circumstances, and an object of the present invention is to provide an air guide structure of a saddle-type vehicle which is possible to simplify the structure of an air intake hole for introducing traveling air into an air guide passage formed by overlapping parts of a vehicle-body cover and is possible to improve vehicle appearance by suppressing exposure of the air intake hole.

The above and other objects can be achieved according to the present invention by providing, in one aspect, an air guide structure of a saddle-type vehicle includes a front side cover which covers a front side of the saddle-type vehicle, extends in a vehicle longitudinal direction, and includes a first cover member and a second cover member. The first cover member is arranged inside the second cover member. The second cover member overlaps the first cover member to partially cover the first cover member from outside. A cavity extending in the vehicle longitudinal direction is formed as an air guide passage by overlapping the first cover member and the second cover member. An outer edge of the second cover member separates from the first cover member at a part of a front side of the air guide passage to form a gap. An air intake hole is formed downward by the gap and is configured to introduce traveling air into the air guide passage.

According to the present invention, the first cover member and the second cover member of the front side cover are overlapped with each other so as to form the air guide passage, and the air intake hole for introducing traveling air into the air guide passage is formed by the gap between the mating surfaces of the first cover member and the overlapping second cover member, thereby simplifying the structure of the air intake hole. Further, since the air intake hole is formed to face downward, the exposure of the air intake hole can be suppressed and the air intake hole becomes less conspicuous, and the vehicle appearance can be improved.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Figure 1:
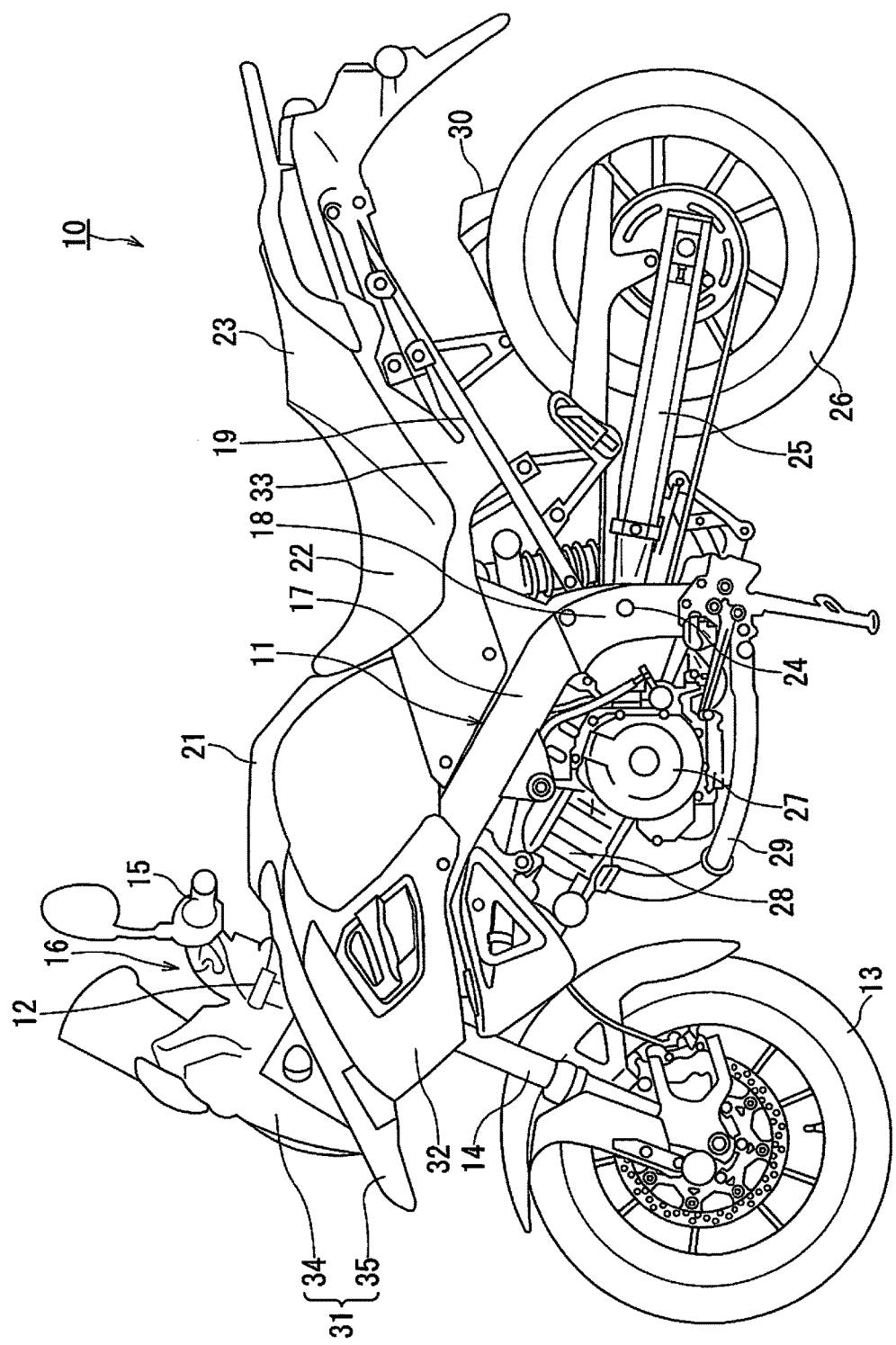
FIG. 1 is a left side view of the entire motorcycle to which one embodiment of an air guide structure of a saddle-type vehicle according to the present invention is applied.
Figure 2:
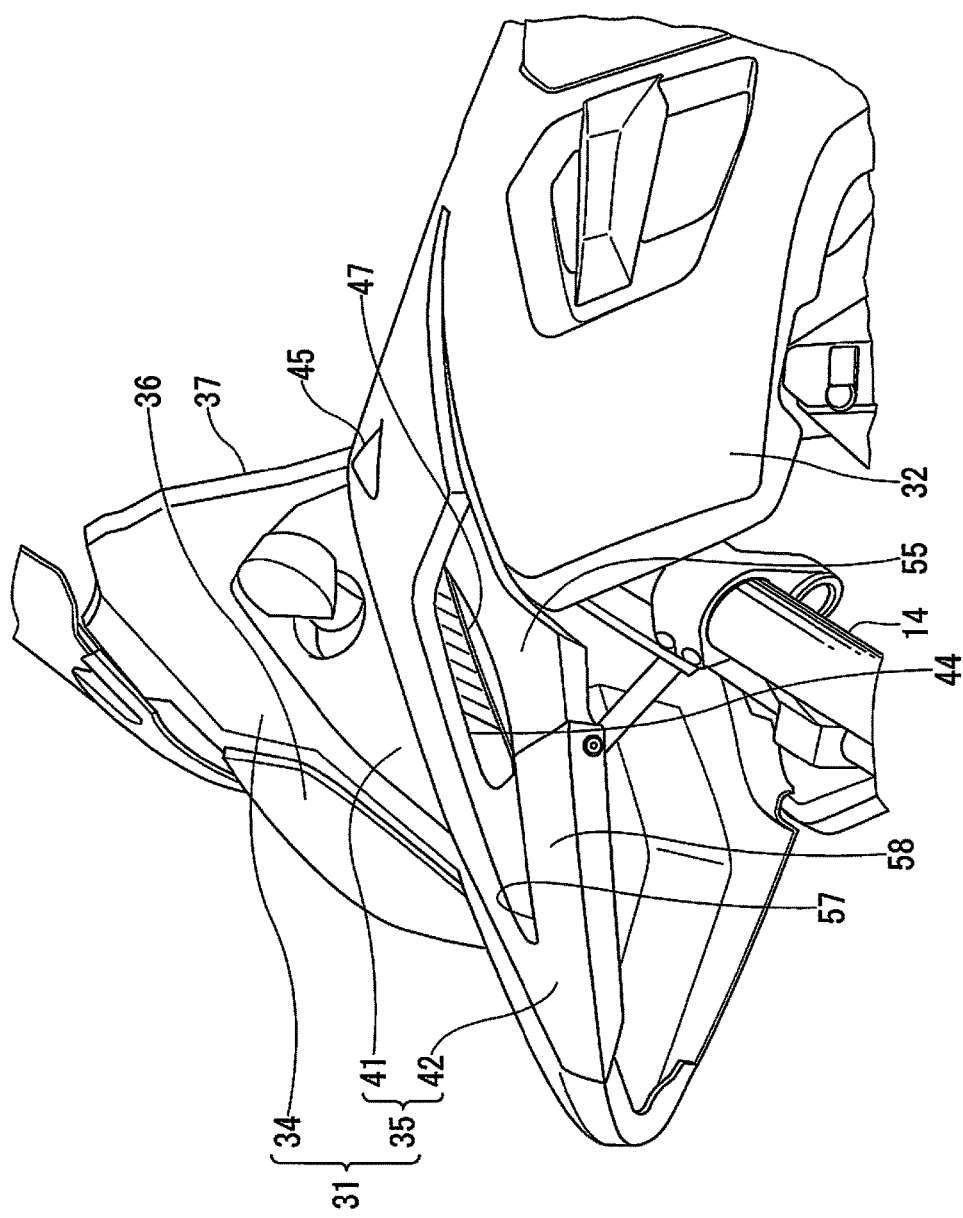
FIG. 2 is a perspective view of the front portion of the motorcycle in FIG. 1 when viewed obliquely from below.
Figure 3:
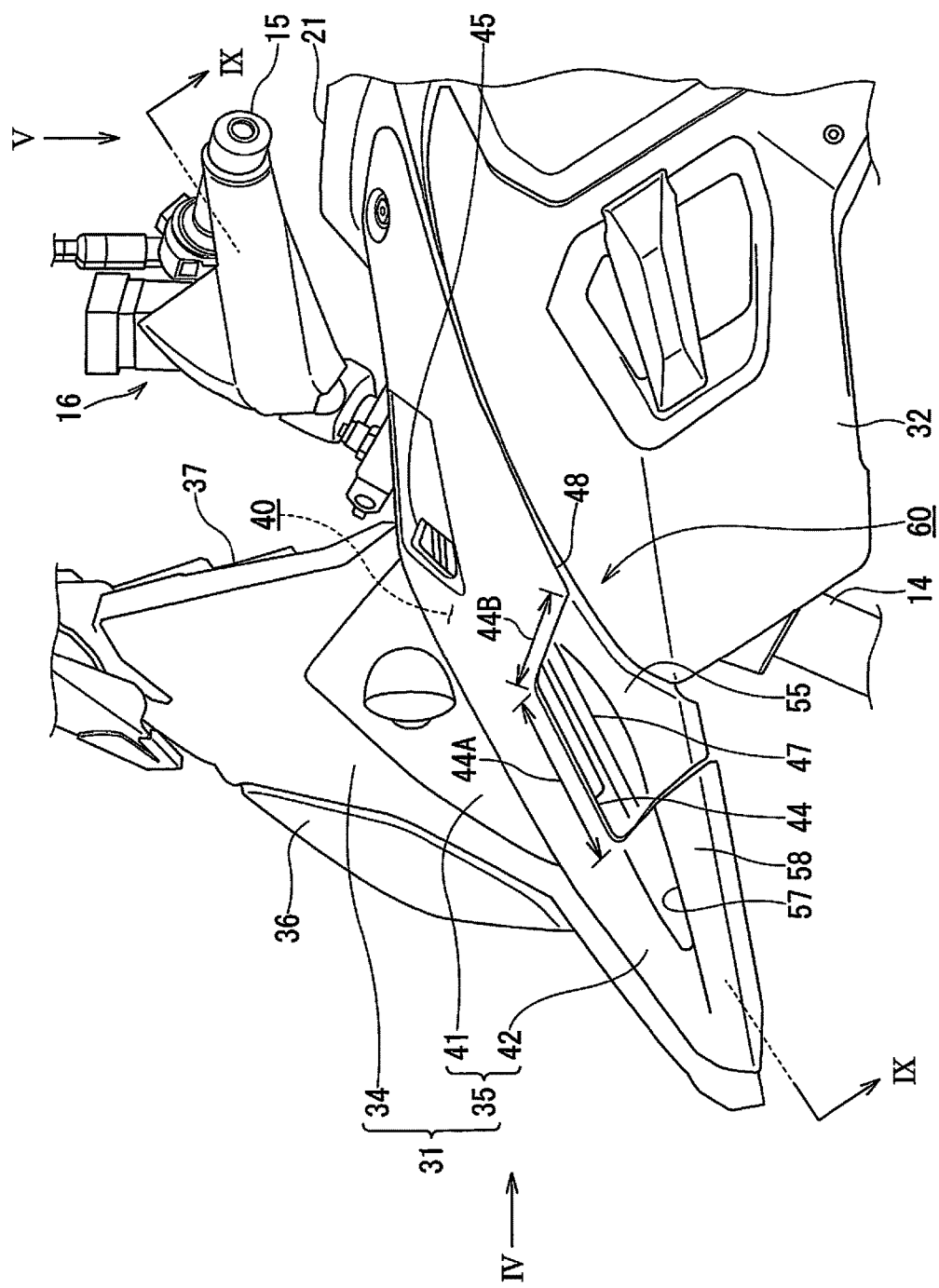
FIG. 3 is a left side view of the front portion of the motorcycle in FIG. 1.

An embodiment of the present invention will be described below with reference to accompanying drawings. FIG. 1 is a left side view of the entire motorcycle to which one embodiment of an air guide structure of a saddle-type vehicle according to the present invention is applied. FIG. 2 is a perspective view of the front portion of the motorcycle in FIG. 1 when viewed obliquely from below. FIG. 3 is a left side view of the front portion of the motorcycle in FIG. 1. In the embodiments, terms such as upper, lower, left, right, front, and rear are based on a rider who is riding on a vehicle.

As shown in FIG. 1, the motorcycle 10 includes a body frame 11, and a head pipe 12 is installed in front of the body frame 11. The head pipe 12 is provided with a steering mechanism 16. The steering mechanism 16 is configured of a left-and-right pair of front suspensions 14, which includes a suspension mechanism (not shown) and rotatably supports a front wheel 13, and handlebars 15 and the like. The front wheel 13 is steered to the left and right by operating the handlebars 15.

The body frame 11 is, e.g., a twin tube type, and includes a left-and-right pair of main frames 17, a left-and-right pair of center frames 18, a seat rail (not shown) extending backward from the rear portion of the center frames 18, and a seat pillar 19. The left-and-right pair of main frames 17 is expanded in the vehicle-width direction immediately posterior to the head pipe 12, and then extends diagonally downward and backward in parallel with each other. The left-and-right pair of center frames 18 is connected to the respective rear end portions of the main frames 17 and extends approximately in the vehicle vertical direction.

A fuel tank 21 is disposed above the main frames 17. In the rear of this fuel tank 21, a rider seat 22 and a pillion seat 23 are disposed one by one above the seat rail and the seat pillar 19. A pivot shaft 24 is installed approximately in the middle lower part of the center frames 18, and a swing arm 25 is swingably supported by the pivot shaft 24 such that the swing arm 25 can swing upward and downward. A rear wheel 26 is rotatably supported at the rear end portion of this swing arm 25.

An engine 27 is suspended by the main frames 17 and the center frames 18 at a lower portion, below the fuel tank 21, of a substantial center in the longitudinal direction between the front wheel 13 and the rear wheel 26. The driving force of the engine 27 is transmitted to the rear wheel 26 via components such as a non-illustrated drive chain.

Components of an engine intake system such as a throttle body, a fuel injector, and an air cleaner (not shown) are connected in series to the rear portion of a cylinder head 28 which is included in the engine 27. Air-fuel mixture is supplied from this engine intake system to a non-illustrated combustion chamber of the engine 27.

Additionally, an exhaust pipe 29 and an exhaust muffler 30 are connected in series to the front portion of the cylinder head 28, and the exhaust pipe 29 and the exhaust muffler 30 are included in an engine exhaust system. The exhaust pipe 29 extends downward from the front portion of the cylinder head 28 and further extends backward in such a manner that the rear end portion of the exhaust pipe 29 is connected to the exhaust muffler 30. In the present embodiment, the exhaust muffler 30 is disposed at the right side of the rear wheel 26 in the rear and lower portion of the motorcycle 10.

The front portion of the motorcycle 10 is covered with the front cover 31, both sides of the motorcycle 10 are covered with respective tank side covers 32, and the bottom of the motorcycle 10 under the rider seat 22 and the pillion seat 23 is covered with the rear cover 33 and the like. Those vehicle-body covers such as the front cover 31, the tank side covers 32, and the rear cover 33 protect equipment inside the motorcycle 10 and improve vehicle appearance.

Figure 4:
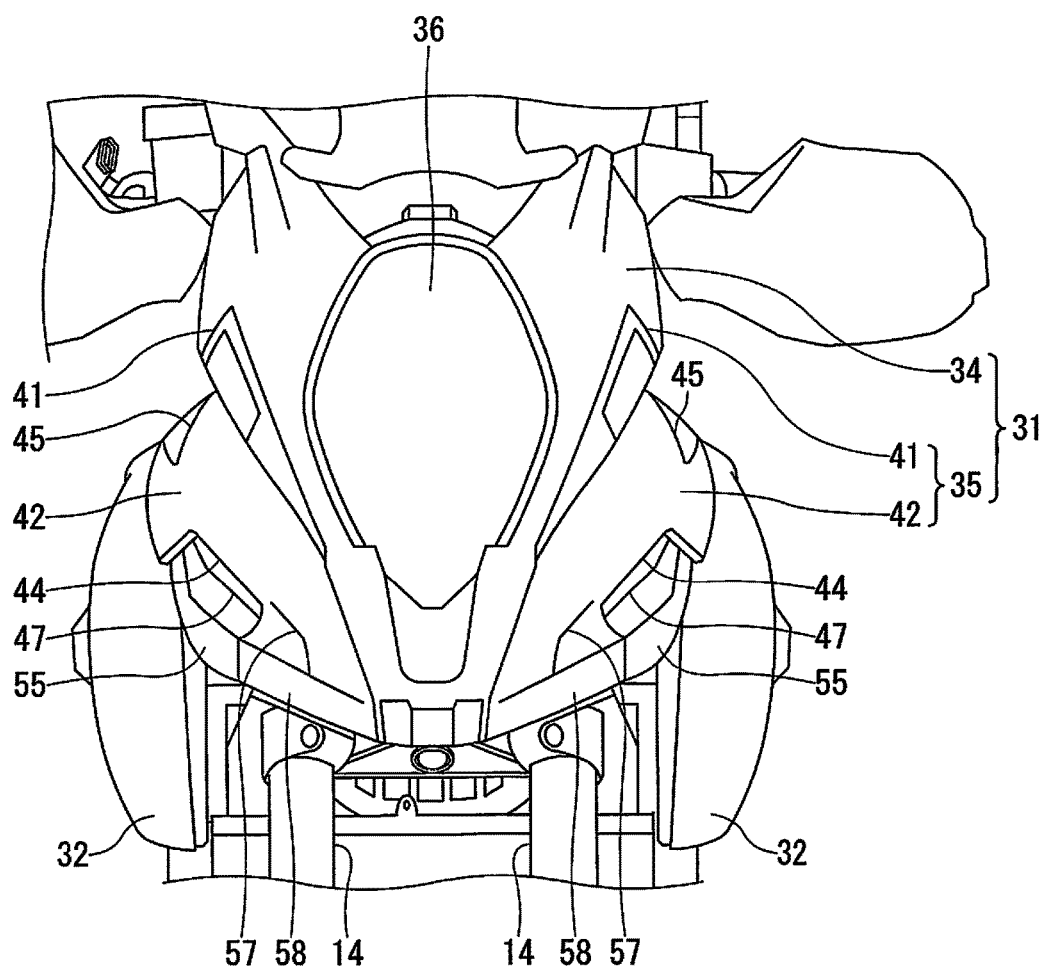
FIG. 4 is a view on arrow IV in FIG. 3.

As shown in FIG. 2 to FIG. 4, the above-described front cover 31 is positioned at the front portion of the vehicle and in front of the fuel tank 21, and includes a main front cover 34 and a left-and-right pair of front side covers 35. The main front cover 34 is positioned at the front face of the vehicle and includes a headlight 36 on the front side and a meter panel 37 on the rear side. Additionally, the respective front side covers 35 covers both sides of the main front cover 34 and extend in the vehicle longitudinal direction. Each of the front side covers 35 includes a first cover member 41 (FIG. 6 and FIG. 13) disposed at the vehicle inner side and a second cover member 42 (FIG. 8 and FIG. 14) which is overlapped on this first cover member 41 and covers a part of the first cover member 41 from outside.

Figure 9:
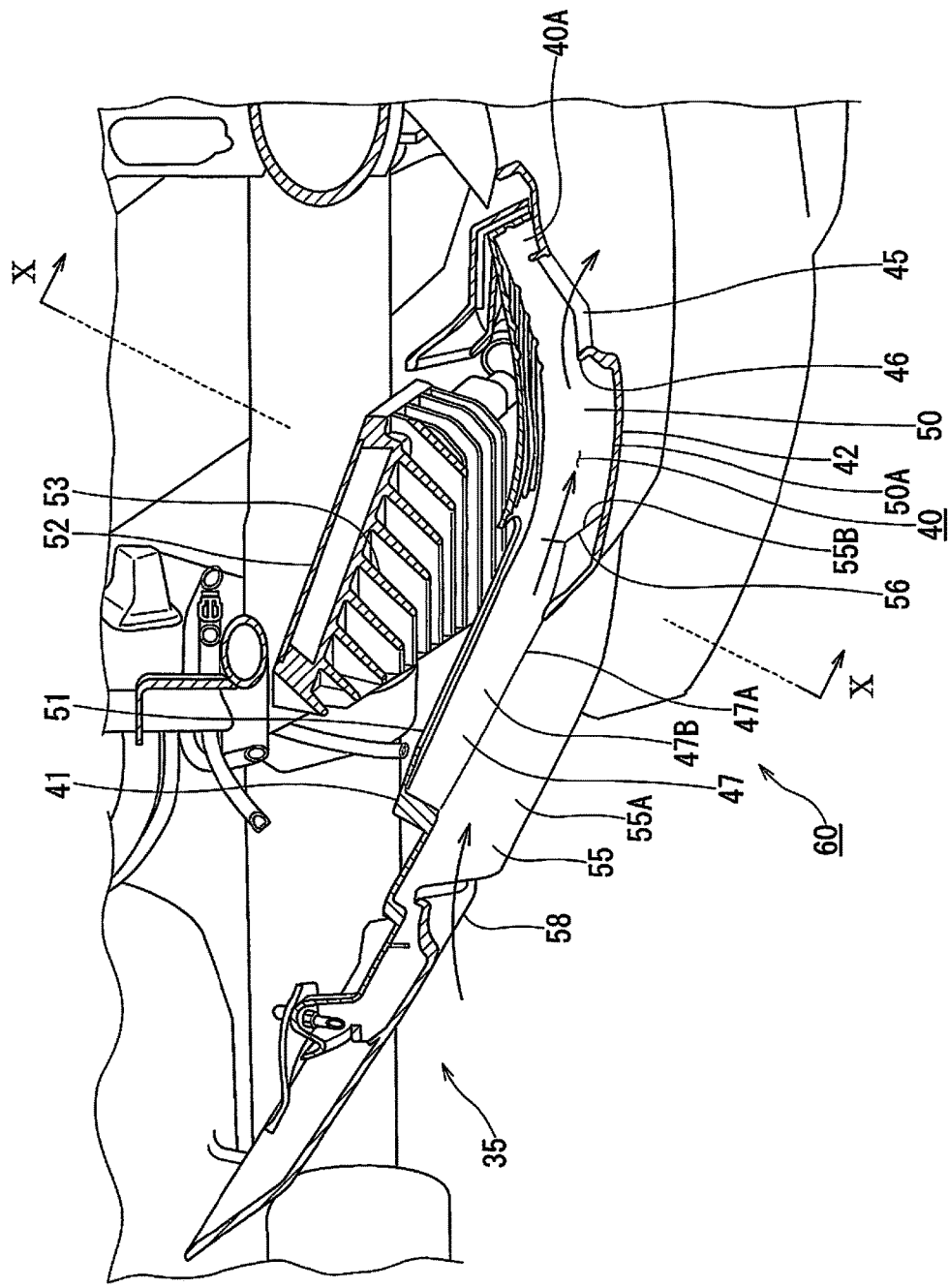
FIG. 9 is a cross-sectional view along the line IX-IX of FIG. 3.
Figure 10:
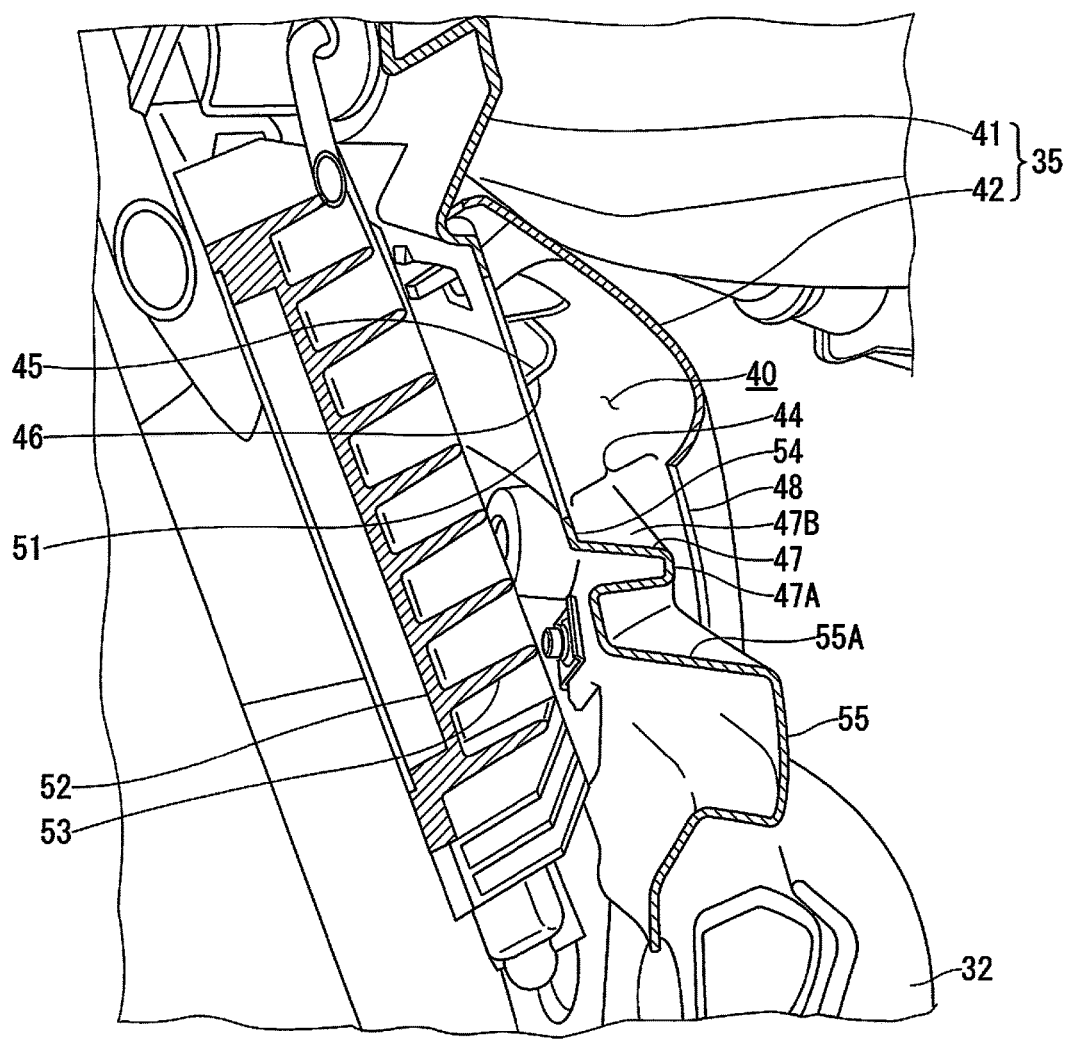
FIG. 10 is a cross-sectional view along the line X-X of FIG. 9.
Figure 12A:
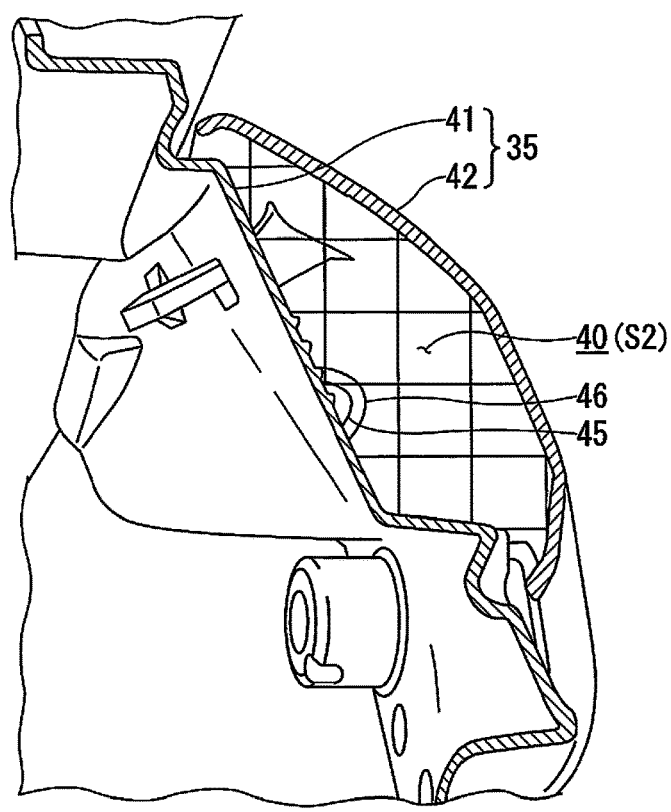
FIG. 12A is a cross-sectional view along the line XII-XII of FIG. 8.
Figure 12B:
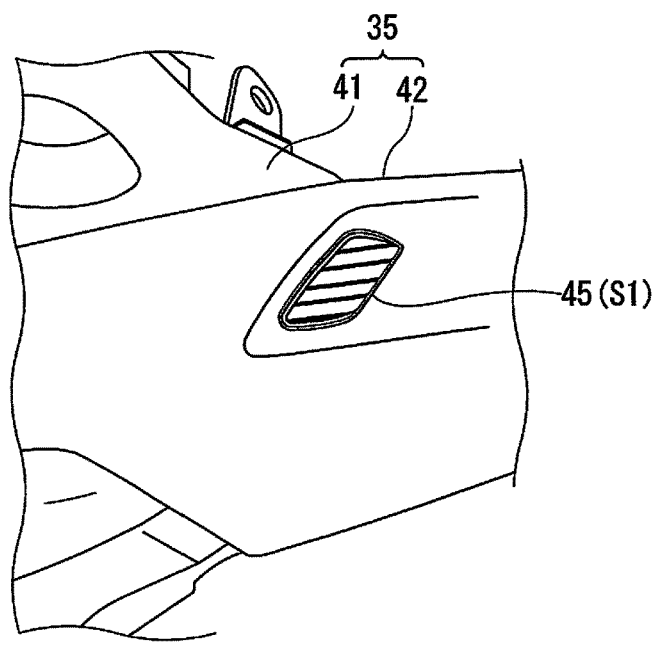
FIG. 12B is an enlarged plan view illustrating the air-exhaust hole 45 and its peripheral region in FIG. 5.

Each of the first cover members 41 is positioned at the vehicle inner side as shown in FIG. 10 and FIG. 12, and the lower part of each of the first cover members 41 protrudes outward. Each of the second cover members 42 is positioned at the vehicle outer side and the upper part of each of the second cover members 42 extends toward the vehicle inner side. As is also shown in FIG. 9, a cavity (i.e., hollow portion) extending in the vehicle longitudinal direction is formed by overlapping the first cover member 41 and the second cover member 42, and the cavity constitutes the air guide passage 40. As shown in FIG. 9, the air guide passage 40 is formed in such a shape that a passage cross-sectional area of its rear portion gradually decreases toward the vehicle rear, i.e., formed so as to be narrow in the rear.

Figure 14A:
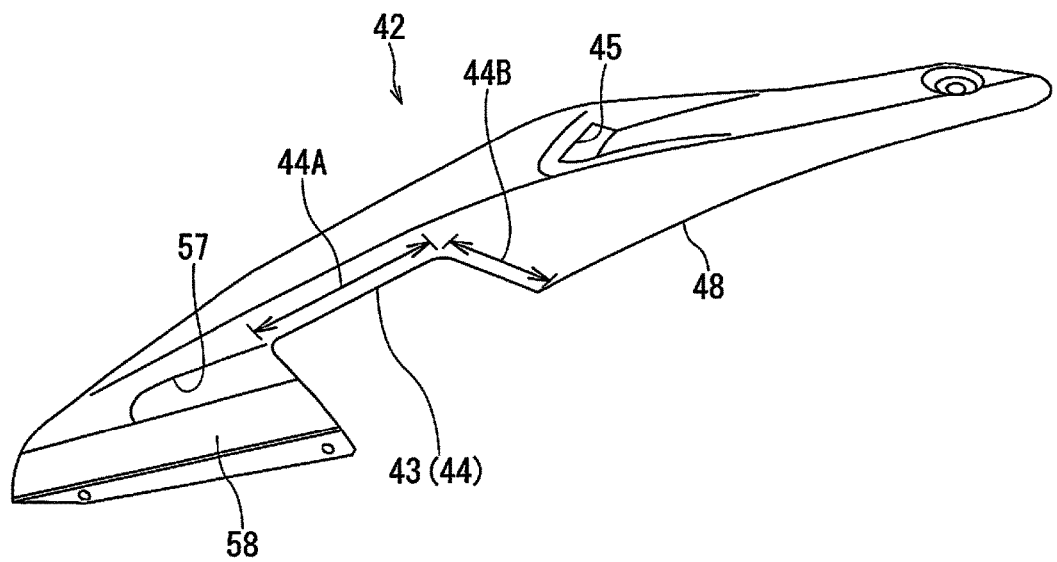
FIG. 14A is a side view of the second cover member of the front side cover, which corresponds to FIG. 3.

As shown in FIG. 3, FIG. 10, FIG. 14A, and FIG. 14B, an outer edge portion 48 of each of the second cover members 42 separates from the first cover member 41 toward the outside of the vehicle at a part of the front edge side of the air guide passage 40 thereby forming a gap (clearance), and by this clearance, an air intake hole 44 for introducing traveling air into the air guide passage 40 is formed downward. The part of the front edge side of the air guide passage 40 of each of the second cover members 42 is a concave portion 43 which is formed approximately into a U-shape in a vehicle side view. As shown in FIG. 3 and FIG. 14A, each of the air intake holes 44 is formed such that its front-side main portion 44A faces toward obliquely backward and downward and its rear side portion 44B faces toward obliquely forward and downward.

As shown in FIG. 3, FIG. 5, FIG. 14A, and FIG. 14B, each of the second cover members 42 includes an air-exhaust hole 45 (FIG. 9 and FIG. 4) on the side of the rear end portion 40A of the air guide passage 40, and each of the air-exhaust holes 45 exhausts air flowing inside the air guide passage 40 toward the rear side of the vehicle. Each of the air-exhaust holes 45 is arranged at the upper part of the second cover member 42 and is arranged inward with respect to the outer edge portion 48 of the second cover member 42 in a vehicle plan view. Specifically, in a plan view of the vehicle, each of the air-exhaust holes 45 is provided in front of the fuel tank 21 and the rider seat 22 on which the rider seats, and is provided obliquely forwardly and downwardly of each handlebar 15. The air-exhaust holes 45 may be provided abreast of the meter panel 37 in the vehicle longitudinal direction in the vehicle plan view, or may be provided closer to a rear side of the vehicle than the meter panel 37.

Figure 8:
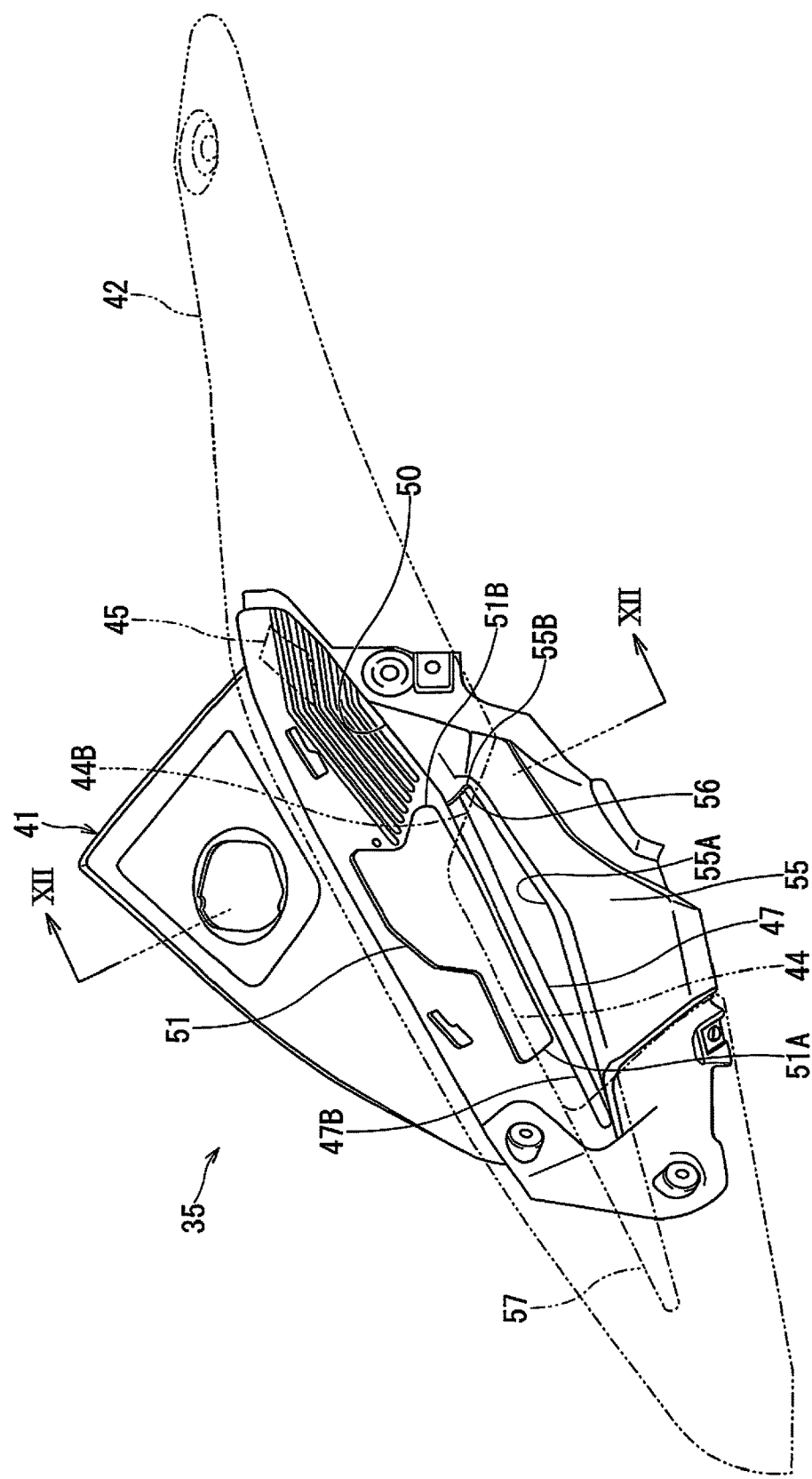
FIG. 8 is a left side view illustrating arrangement relationship between the first cover member and the second cover member of the front side cover in FIG. 3.

Additionally, as shown in FIG. 9, each of the air-exhaust holes 45 is positioned near the rear end portion 40A of the air guide passage 40 and in front of this rear end portion 40A. A barb portion 46 is provided around each of air-exhaust holes 45 and protrudes toward the back surface of the second cover member 42. As shown in FIG. 8 and FIG. 12, each of the air-exhaust holes 45 is formed such that its cross-sectional area (i.e., opening area) S1 is smaller than the passage cross-sectional area S2 (i.e., the cross-hatched region in FIG. 12A) of the air guide passage 40 approximately in the middle in the vehicle longitudinal direction (S1<S2).

Figure 6:
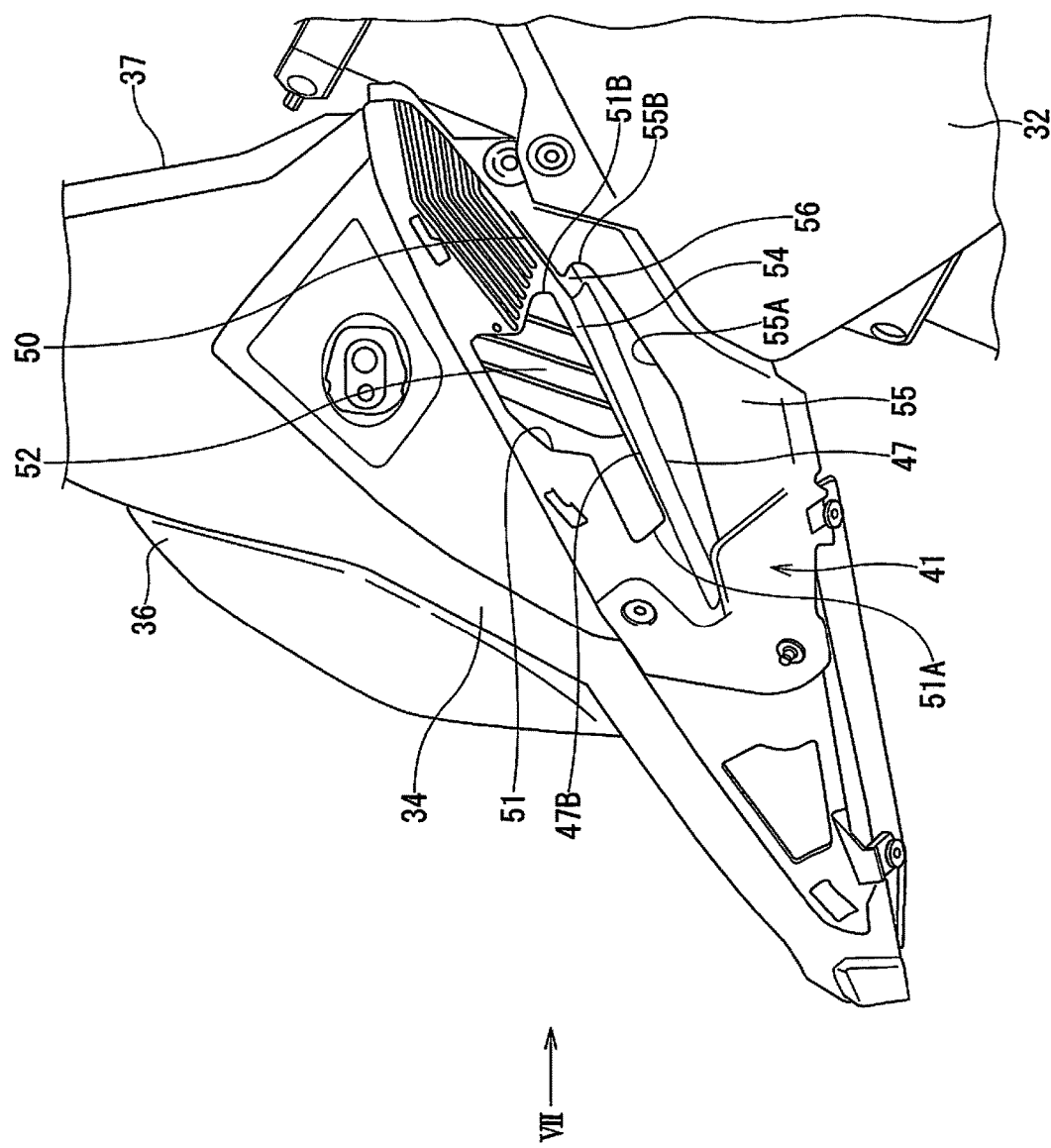
FIG. 6 is a left side view illustrating components such as the first cover member when the second cover member of the front side cover in FIG. 3 is detached.
Figure 11:
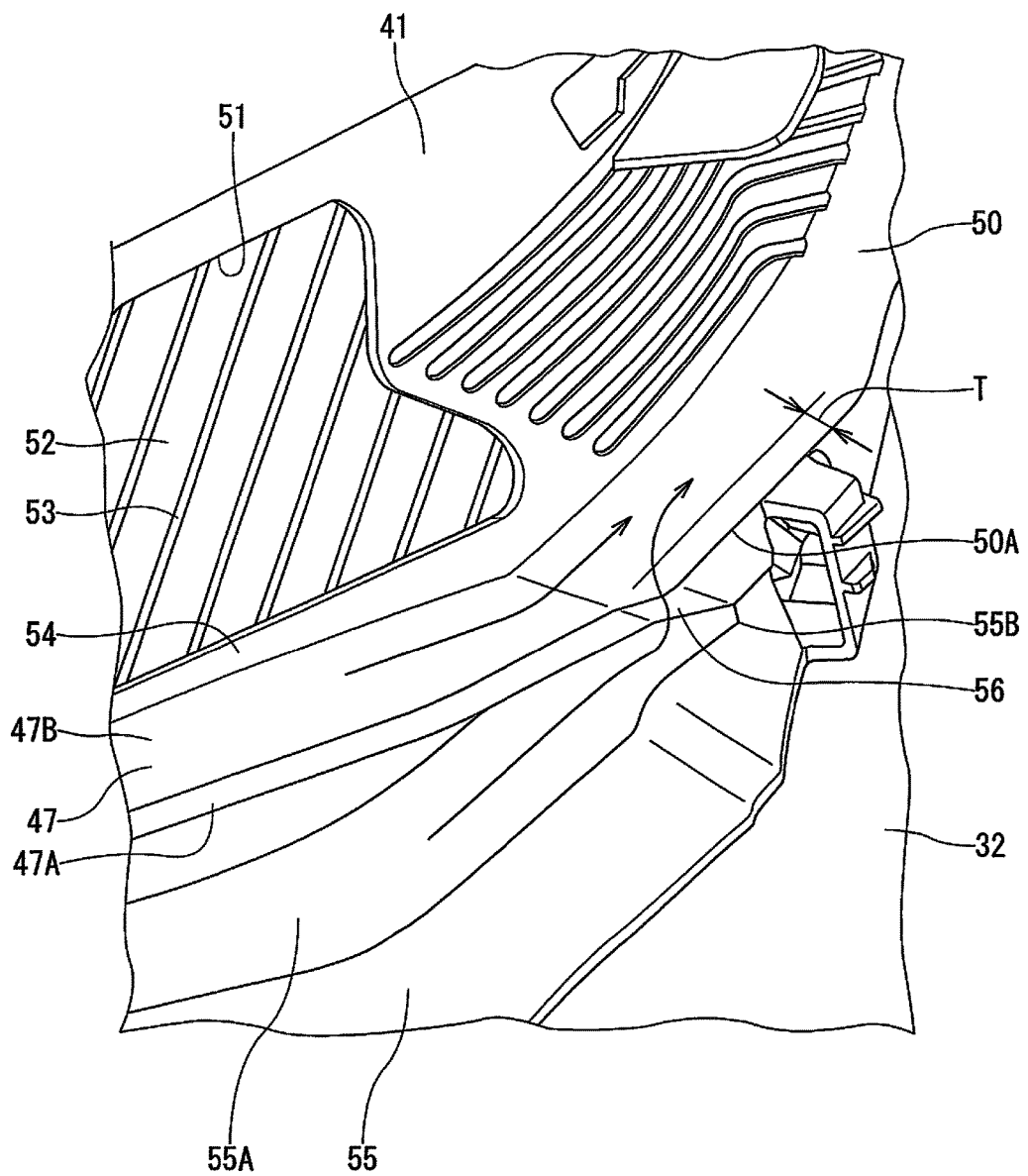
FIG. 11 is an enlarged perspective view of the circular region XI in FIG. 7.
Figure 13:
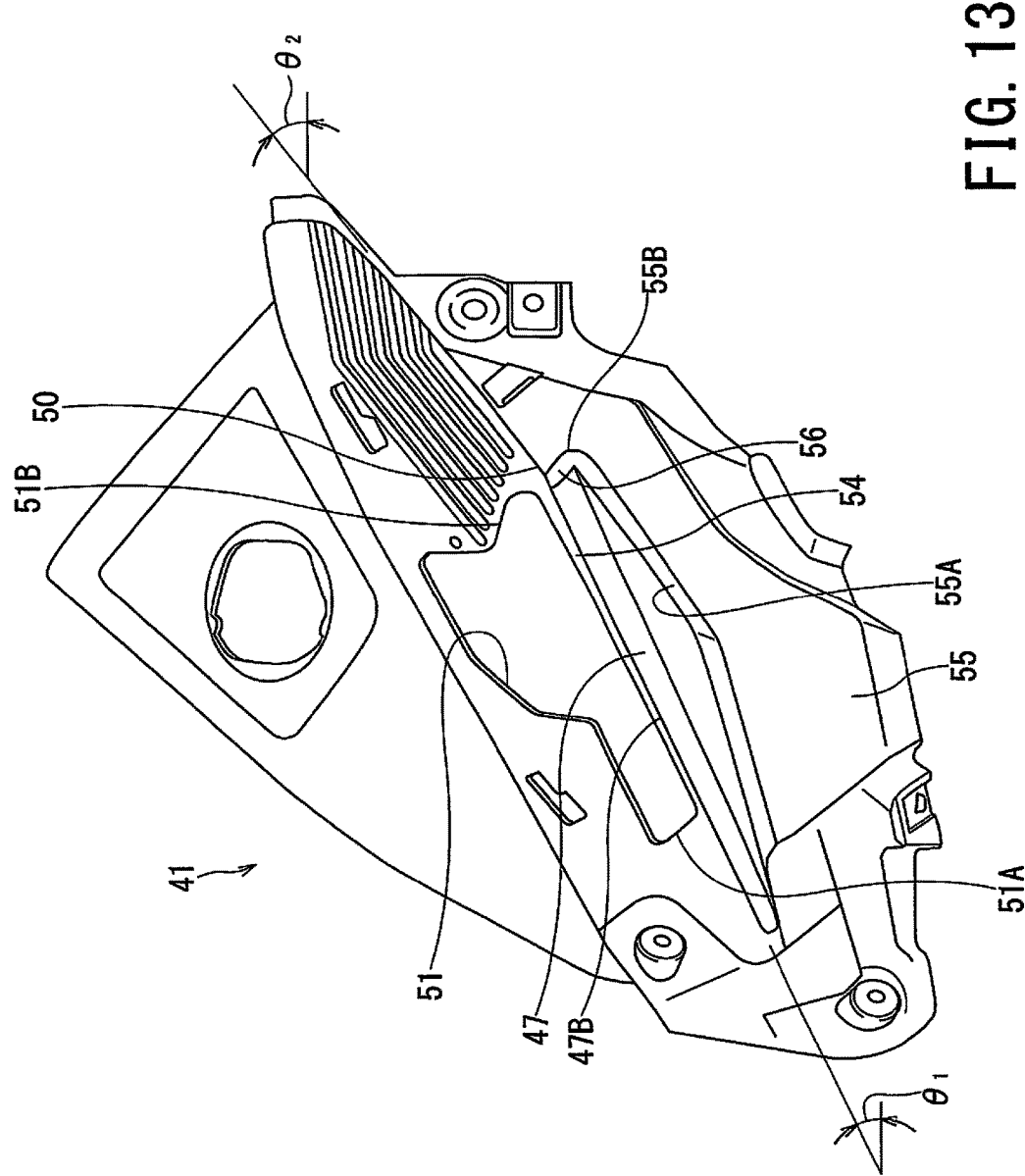
FIG. 13 is a left side view illustrating the first cover member of the front side cover in FIG. 6 and FIG. 8.
Figure 14B:
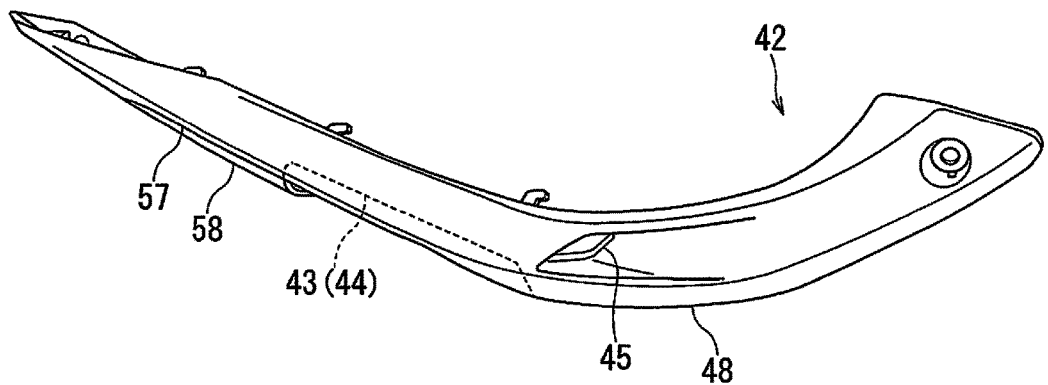
FIG. 14B is a plan view of the second cover member of the front side cover, which corresponds to FIG. 5.

As shown in FIG. 3 and FIG. 6, each of the first cover members 41 includes an air guide rib 47 under the air intake hole 44 which is formed between the first cover member 41 and the second cover member 42. Each of the air guide ribs 47 protrudes toward the vehicle outside and extends in the vehicle longitudinal direction. As shown in FIG. 13, each of the air guide ribs 47 extends and inclines to rise backward by a predetermined angle θ1 with respect to a horizontal plane which is in parallel with the vehicle longitudinal direction. Additionally, as shown in FIG. 9 and FIG. 10, the outer edge 47A of each of the air guide ribs 47 is positioned inside the outer edge portion 48 of the second cover member 42 in a vehicle plan view. Further, as shown in FIG. 9 and FIG. 11, in a vehicle plan view, the dimension of the outer edge 47A of each of the air guide ribs 47 is offset inward by T with respect to an outer edge 50A of a rear air guide portion 50 (as described below) which is covered with the second cover member 42.

As shown in FIG. 8 and FIG. 9, the rear air guide portion 50 is formed on each of the first cover members 41 so as to be continuous with the rear end portion of the air guide rib 47 and extend toward the air-exhaust hole 45 of the second cover member 42. As shown in FIG. 13, each of the rear air guide portions 50 extends and inclines with respect to the horizontal plane (i.e., the vehicle longitudinal direction) by the angle θ2 that is larger than the above-described predetermined tilting angle θ1 of the air guide ribs 47. The rear air guide portion 50 leads air flowing inside the air guide passage 40 to the air-exhaust hole 45.

As shown in FIG. 6 and FIG. 8, each of the first cover members 41 includes an air guide hole 51, which communicates with internal space of the motorcycle 10 and positioned above the air guide rib 47 and approximately in the middle of the first cover member 41 in the vehicle longitudinal direction. Each of the air guide holes 51 is at least partially covered with the second cover member 42 in a vehicle side view, e.g., approximately the entirety of each of the air guide holes 51 is covered with the second cover member 42. Further, the air guide hole 51 is formed to extend such that its rear end portion 51B is positioned closer to the rear side of the vehicle of the vehicle than the air intake hole 44. With these features, it becomes easy to introduce traveling air, which is taken in from the air intake hole 44 and flows toward the rear of the vehicle, into the air guide hole 51. Additionally, the front end portion 51A of each of the air guide holes 51 is positioned on the rear side of the vehicle than the front end portion of each of the air intake holes 44.

Figure 7:
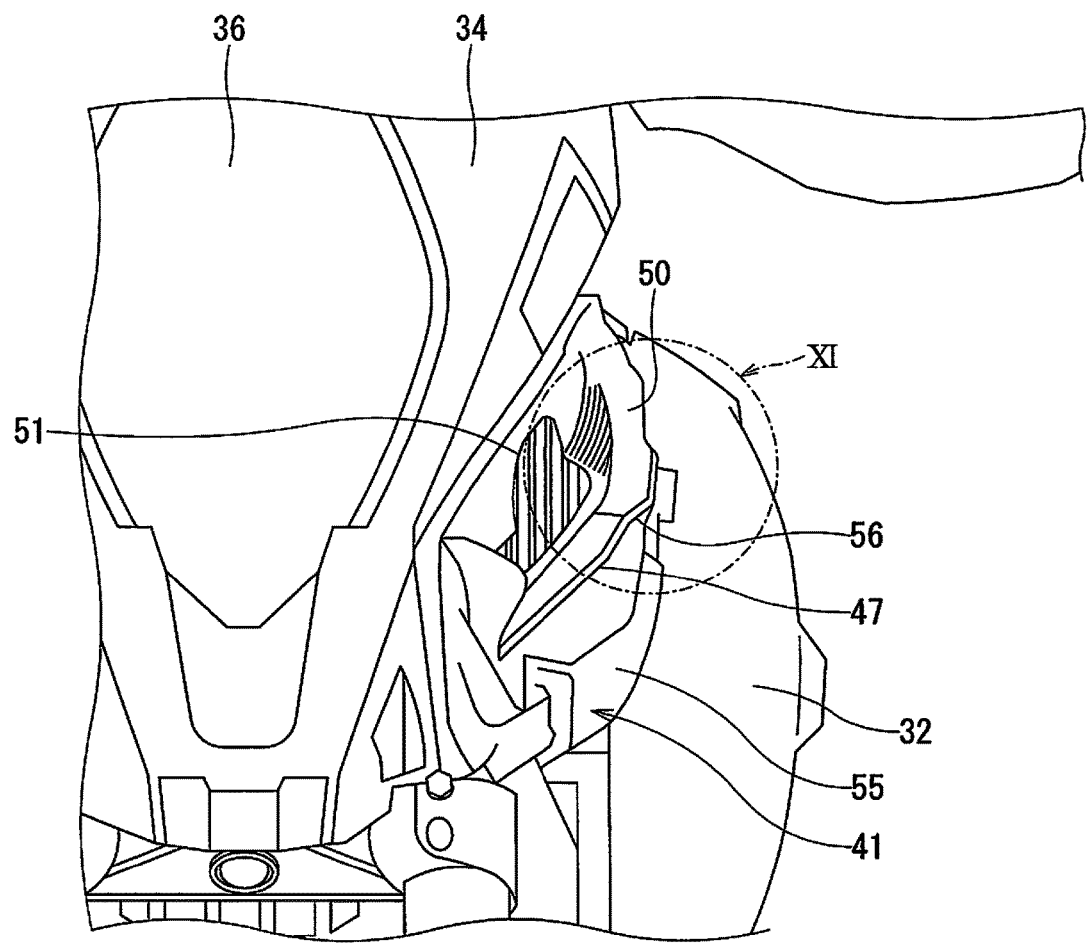
FIG. 7 is a view on arrow VII in FIG. 6.

As shown in FIG. 9, electric equipment such as rectifier 52 tending to generate heat is installed in the vehicle internal space corresponding to the air guide hole 51 such that its cooling fins face to the air guide hole 51. Additionally, as shown in FIG. 10 and FIG. 11, a wall-shaped structure 54 is formed to extend in the vehicle vertical direction between the lower edge of each of the air guide holes 51 and the top surface 47B of each of the air guide ribs 47 such that the lower edge of each air guide hole 51 and each air guide rib 47 are made continuous with each other. As shown in FIG. 6, FIG. 7, and FIG. 9, each of the first cover members 41 is provided with the first protrusion portion 55 which is positioned under the air guide rib 47 and protrudes outward. As shown in FIG. 2, each of the air intake holes 44 is covered, below the air guide rib 47, with this first protrusion portion 55. As shown in FIG. 8 and FIG. 13, the first protrusion portion 55 of each first cover member 41 is formed such that the top surface 55A of its rear side portion is tilted up in the back and its rear end portion 55B extends toward the rear end portion 44B of the air intake hole 44. Such a structure of each first protrusion portion 55 allows traveling air flowing along the top surface 55A of the first protrusion portion 55 to be more easily led into the air intake hole 44.

Further, as shown in FIG. 11, each of the first protrusion portions 55 is connected to the front end portion of the rear air guide portion 50 on the vehicle outer side of the rear end portion of the air guide rib 47 via a stepped portion 56. Each of the stepped portions 56 is formed as the result of providing the first protrusion portion 55 to be lower than the rear air guide portion 50.

As shown in FIG. 3, FIG. 4, and FIG. 14, each of the second cover members 42 includes an air guide groove 57 in front of the air intake hole 44 in a vehicle side view, and this air guide groove 57 is extended in the vehicle longitudinal direction and recessed toward the vehicle inside. Each of the air guide grooves 57 leads traveling air into the air intake hole 44. Additionally, each of the second cover members 42 is provided with the second protrusion portion 58 which is positioned under the air guide groove 57 and protrudes toward the vehicle outside. Each of the second protrusion portions 58 is formed so as to be continuous with the first protrusion portion 55 of the first cover member 41 in the vehicle longitudinal direction.

As described above, the front side cover 35 equipped with the first cover member 41 and the second cover member 42 shown in FIG. 3 and FIG. 6 is provided with an air guide structure 60 which includes the air guide passage 40, the air intake hole 44, the air-exhaust hole 45, the air guide rib 47, the rear air guide portion 50, the air guide hole 51, the wall-shaped structure 54, the stepped portion 56, the first protrusion portion 55, the second protrusion portion 58, and the air guide groove 57. Thus, according to the present embodiment, the following effects (1) to (15) can be obtained by the above-described air guide structure 60.

(1) As shown in FIG. 3, FIG. 9, and FIG. 10, the first cover member 41 and the second cover member 42 of the front side cover 35 are overlapped with each other so as to form the air guide passage 40, and the air intake hole 44 for taking in traveling air is formed by the gap between the mating surfaces of the first cover member 41 and the overlapping second cover member 42, thereby simplifying the structure of the air intake hole 44. Further, since each of air intake holes 44 is formed to face downward, the exposure of the air intake holes 44 can be suppressed and the air intake holes 44 becomes less conspicuous, and the vehicle appearance can be improved.

(2) The air intake hole 44 is formed by the approximately U-shaped concave portion 43 (FIG. 14) of each of the second cover members 42, and the front-side main portion 44A of the air intake hole 44 is formed to face toward obliquely backward and downward and the rear side portion 44B of the air intake hole 44 is formed to face toward obliquely forward and downward. The front upper portion of the front-side main portion 44A of each of the air intake holes 44 is covered with the second cover member 42, whereby it makes difficult for the foreign materials to intrude into the air intake hole 44 and the air intake holes 44 become less conspicuous. Additionally, since the rear side portion 44B of each of the air intake holes 44 is slightly directed forward, traveling air can be effectively introduced into inside of each of the air intake holes 44.

Figure 5:
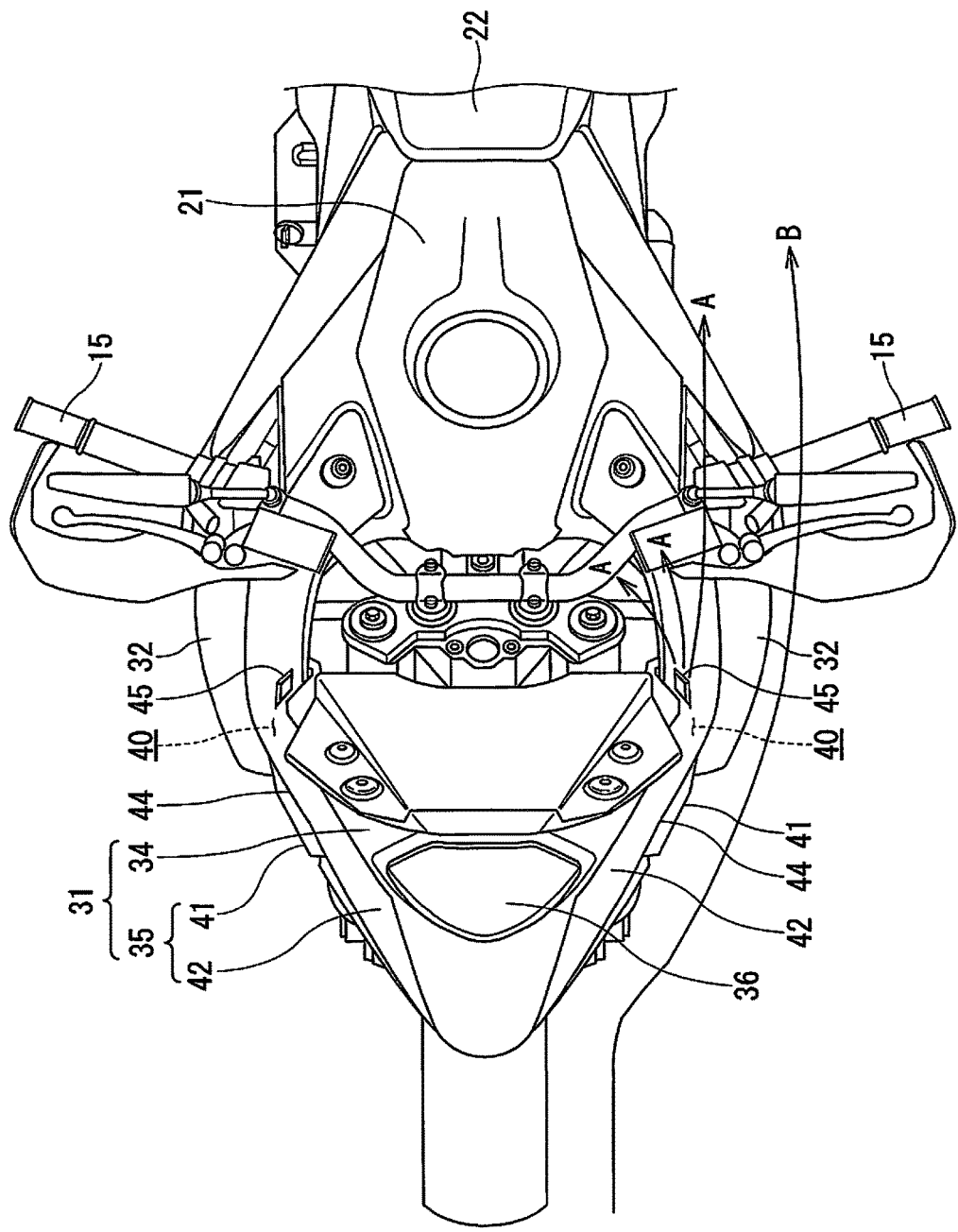
FIG. 5 is a view on arrow V in FIG. 3.

(3) As shown by the arrows A in FIG. 5, the air-exhaust hole 45 of each of the second cover members 42 exhausts air flowing inside the air guide passage 40 toward the back of the vehicle. Although there is a phenomenon that traveling air flowing outside the vehicle-body cover such as the second cover members 42 and the tank side covers 32 like the arrow B is drawn inward in front of the rider seated on the rider seat 22, this phenomenon can be relieved by the aerial flow from the air-exhaust holes 45.

(4) As shown in FIG. 3 and FIG. 5, air inside the air guide passage 40 being exhausted from the air-exhaust hole 45 of each of the second cover members 42 also flows into the region immediately in the rear of the meter panel 37 which is positioned inward in the vehicle-width direction. Thus, it is possible to suppress negative pressure which is generated in the region immediately in the rear of the meter panel 37 and draws the head of the rider forward, and thus comfort of the rider can be enhanced.

(5) As shown in FIG. 9, the air-exhaust hole 45 of each of the second cover members 42 is formed near the rear end portion 40A of the air guide passage 40 and in front of this rear end portion 40A, and the barb portion 46 is further formed near the air-exhaust hole 45 in the reverse side of each of the second cover members 42 so as to protrude inside the air guide passage 40. Although foreign materials such as water and dust intrude into inside each of the air guide passages 40 together with traveling air, those foreign materials collide with the barb portion 46 and remain around the rear end portion 40A of each of the air guide passages 40, which makes those foreign materials hard to reach the air-exhaust hole 45. As the result, it is possible to purify the air inside each of the air guide passages 40 which is exhausted from the air-exhaust hole 45 and flows toward the rider.

(6) As shown in FIG. 9 and FIG. 12, the cross-sectional area (opening area) S1 of each of the air-exhaust holes 45 is set as a value smaller than the passage cross-sectional area S2 of each of the air guide passages 40 approximately in the middle in the vehicle longitudinal direction. Accordingly, it is possible to exhaust a part of the air flowing inside each of the air guide passages 40 from each of the air-exhaust holes 45 toward the rear of the vehicle and lead the rest of the air into each of the air guide holes 51, and thus, it is possible to effectively distribute and flow the air inside each of the air guide passages 40.

(7) As shown in FIG. 3 and FIG. 10, since the air guide rib 47 of each of the first cover members 41 is formed under the air intake hole 44 so as to protrude outward in the vehicle-width direction, each of the air guide ribs 47 blocks foreign materials such as water and dust rising from under along the wall surface of each of the first cover members 41. Thus, it is possible to prevent foreign materials from intruding into inside of each of the air intake holes 44.

(8) As shown in FIG. 3, FIG. 8, and FIG. 11, each of the air guide ribs 47 is extended so as to be tilted up in the rear by the predetermined angle θ1 with respect to the horizontal plane which is in parallel with the vehicle longitudinal direction. Thus, it is possible to effectively lead the traveling air flowing along the top surface 47B of each of the air guide ribs 47 into each of the air intake holes 44 which is faced downward. Further, traveling air colliding with each of the air guide ribs 47 generates downward reaction force acting on each of air guide ribs 47, which improves grounding property of the front wheel 13 of the motorcycle 10, and thus driving stability of the motorcycle 10 can be enhanced.

(9) As shown in FIG. 3, FIG. 8, and FIG. 11, in a vehicle plan view, the dimension of the outer edge 47A of each of the air guide ribs 47 is offset inward by T with respect to the outer edge 50A of the rear air guide portion 50 which is covered with each of the second cover members 42. Hence, the exposed portion of each of the air guide ribs 47, of which the side is not covered with the second cover member 42, is positioned inside of the vehicle as shown in FIG. 4 and FIG. 10. As the result, foreign materials such as water and dust are unlikely to be moved to the top surface 47B of each of the air guide ribs 47, and thus, it is possible to suppress intrusion of the foreign material into each of the air guide passages 40 via each of the air intake holes 44.

(10) The air guide hole 51 of each of the first cover members 41 is covered with the second cover member 42 as shown in FIG. 8, thereby allowing less exposure of the space inside the vehicle, and also allowing less exposure of the equipment inside the vehicle (e.g. the rectifier 52 disposed inward corresponding to the air guide hole 51). As the result, appearance of the motorcycle 10 can be improved.

(11) The air guide hole 51 of each of the first cover members 41 is formed to extend such that its rear end portion 51B is positioned in the rear of the air intake hole 44. Thus, it is possible to easily lead traveling air, which is taken in from the air intake holes 44 to flow toward the rear of the vehicle and/or remains inside the air guide passages 40, into the air guide holes 51.

(12) On each of the first cover members 41, the wall-shaped structure 54 is formed between the lower edge of the air guide hole 51 and the top surface 47B of the air guide rib 47 as shown in FIG. 10 and FIG. 11. Thus, each of the wall-shaped structures 54 can block foreign materials which are to intrude from the top surface 47B of the air guide rib 47 toward inside of the vehicle. As the result, it is possible to prevent foreign materials from intruding into each of the air guide holes 51.

(13) As shown in FIG. 8 and FIG. 13, the rear air guide portion 50 of each of the first cover members 41 extends and inclines with respect to the vehicle longitudinal direction by the predetermined angle θ2 (>θ1). Thus, downward reaction force, which is generated by the traveling air colliding with each of the rear air guide portions 50 and acts on each of the rear air guide portions 50, is larger than downward reaction force acting on each of the air guide ribs 47. As the result, grounding property of the front wheel 13 is further improved, and thus driving stability of the motorcycle 10 can be further enhanced.

(14) On each of the first cover members 41, the first protrusion portion 55 is provided under the air intake hole 44 so as to protrude as shown in FIG. 3 and FIG. 4. Hence, each of the air intake holes 44 is covered with the first protrusion portion 55. Thus, each of the first protrusion portions 55 can prevent foreign materials from intruding into the air intake hole 44 together with the air guide ribs 47.

(15) As shown in FIG. 4, FIG. 7, FIG. 11, and FIG. 13, the stepped portion 56 is formed on each of the first cover members 41 at the connection part between the rear end portion 55B of the first protrusion portion 55 and the front end portion of the rear air guide portion 50 as the result of setting the side of the first protrusion portion 55 to become lower than the side of the rear air guide portion 50. Hence, each of the stepped portions 56 blocks foreign materials such as water and dust which flow along the top surface 55A of the first protrusion portion 55 toward the rear of the vehicle together with traveling air, and thus, it is possible to prevent the foreign materials from intruding into each of the air guide passages 40 via each of the air intake holes 44.

The above-mentioned embodiments are presented as examples only, but not intended to limit the scope of the inventions. The embodiments described herein may be embodied in various forms; furthermore, omissions, substitutions and changes of the present embodiments may be made without departing from the spirit of the inventions.

The accompanying claims and their equivalents are intended to cover such modifications as would fall within the scope of the inventions.

What is claimed is:

1. An air guide structure of a saddle-type vehicle comprising:
a front side cover which covers a front side of the saddle-type vehicle, extends in a vehicle longitudinal direction, and includes a first cover member and a second cover member,
wherein the first cover member is arranged inside the second cover member, the second cover member overlapping the first cover member to partially cover the first cover member from outside,
wherein a cavity extending in the vehicle longitudinal direction is formed as an air guide passage by overlapping the first cover member and the second cover member,
wherein an outer edge of the second cover member separates from the first cover member at a part of a front side of the air guide passage to form a gap,
wherein an air intake hole is formed downward by the gap and is configured to introduce traveling air into the air guide passage,
wherein a part of the outer edge of the second cover member providing the air intake hole is a concave portion formed approximately into a U-shape in a vehicle side view,
wherein a front-side main portion of the air intake hole is formed to face toward obliquely backward and downward, and
wherein a rear side portion of the air intake hole is formed to face toward obliquely forward and downward.

2. The air guide structure of a saddle-type vehicle according to claim 1, wherein the second cover member is provided with an air-exhaust hole that is provided on a rear side of the air guide passage and is configured to exhaust the traveling air inside the air guide passage.

3. The air guide structure of a saddle-type vehicle according to claim 2, wherein the air-exhaust hole is arranged at an upper part of the second cover member and is arranged inward with respect to the outer edge of the second cover member in a vehicle plan view.

4. The air guide structure of a saddle-type vehicle according to claim 2, wherein the air-exhaust hole is arranged near and in front of a rear edge of the air guide passage.

5. The air guide structure of a saddle-type vehicle according to claim 2, wherein:
the air guide passage is formed to be narrow in a rear in such a manner that a passage cross-sectional area of a rear portion of the air guide passage gradually decreases toward a vehicle rear; and
an opening area of the air-exhaust hole is smaller than a passage cross-sectional area of the air guide passage approximately in a middle in the vehicle longitudinal direction.

6. The air guide structure of a saddle-type vehicle according to claim 1, wherein:
the first cover member includes an air guide rib; and
the air guide rib is provided under the air intake hole that is formed by the first cover member and the second cover member, protrudes toward outside in a vehicle-width direction, and extends in the vehicle longitudinal direction.

7. The air guide structure of a saddle-type vehicle according to claim 6, wherein the air guide rib extends and inclines to rise backward by a predetermined angle with respect to the vehicle longitudinal direction.

8. The air guide structure of a saddle-type vehicle according to claim 7, wherein:
the first cover member is provided with an air guide hole; and
the air guide hole is arranged above the air guide rib, is arranged in a middle of the first cover member in the vehicle longitudinal direction, and communicates with an internal space of the vehicle.

9. The air guide structure of a saddle-type vehicle according to claim 8, wherein the air guide hole is covered at least partially with the second cover member in a vehicle side view.

10. The air guide structure of a saddle-type vehicle according to claim 8, wherein the air guide hole is formed to extend such that a rear end portion of the air guide hole is positioned closer to a rear side of the vehicle than the air intake hole.

11. The air guide structure of a saddle-type vehicle according to claim 8, wherein a wall-shaped structure is formed to extend in a vehicle vertical direction and is positioned between a lower edge of the air guide hole and a top surface of the air guide rib.

12. An air guide structure of a saddle-type vehicle comprising:
a front side cover which covers a front side of the saddle-type vehicle, extends in a vehicle longitudinal direction, and includes a first cover member and a second cover member,
wherein the first cover member being arranged inside the second cover member, the second cover member overlapping the first cover member to partially cover the first cover member from outside,
wherein a cavity extending in the vehicle longitudinal direction is formed as an air guide passage by overlapping the first cover member and the second cover member,
wherein an outer edge of the second cover member separates from the first cover member at a part of a front side of the air guide passage to form a gap,
wherein an air intake hole is formed downward by the gap and is configured to introduce traveling air into the air guide passage,
wherein the first cover member includes an air guide rib, which is provided under the air intake hole that is formed by the first cover member and the second cover member,
wherein the air guide rib protrudes toward outside in a vehicle-width direction and extends in the vehicle longitudinal direction.

13. The air guide structure of a saddle-type vehicle according to claim 12, wherein the air guide rib extends and inclines to rise backward by a predetermined angle with respect to the vehicle longitudinal direction.

14. The air guide structure of a saddle-type vehicle according to claim 12, wherein:
the first cover member is provided with an air guide hole; and
the air guide hole is arranged above the air guide rib, is arranged in a middle of the first cover member in the vehicle longitudinal direction, and communicates with an internal space of the vehicle.

15. The air guide structure of a saddle-type vehicle according to claim 14, wherein the air guide hole is covered at least partially with the second cover member in a vehicle side view.

16. The air guide structure of a saddle-type vehicle according to claim 14, wherein the air guide hole is formed to extend such that a rear end portion of the air guide hole is positioned closer to a rear side of the vehicle than the air intake hole.

17. The air guide structure of a saddle-type vehicle according to claim 14, wherein a wall-shaped structure is formed to extend in a vehicle vertical direction and is positioned between a lower edge of the air guide hole and a top surface of the air guide rib.

* * * * *